(12) United States Patent (10) Patent No.: US 12,620,595 B2
Rustomji et al. (45) Date of Patent: May 5, 2026

---

(54) INCREASED CAPACITY BATTERY CELL USING RESERVOIR REPLENISHING ADDITIVES

(71) Applicant: SOUTH 8 TECHNOLOGIES, INC., San Diego, CA (US)

(72) Inventors: Cyrus S. Rustomji, San Diego, CA (US); Frederick Krause, Carlsbad, CA (US)

(73) Assignee: SOUTH 8 TECHNOLOGIES, INC., San Diego, CA (US)

( * ) Notice: Subject to any disclaimer, the term of this patent is extended or adjusted under 35 U.S.C. 154(b) by 0 days.

(21) Appl. No.: 19/299,251

(22) Filed: Aug. 13, 2025

(65) Prior Publication Data

US 2026/0051512 A1 Feb. 19, 2026

Related U.S. Application Data

(60) Provisional application No. 63/684,297, filed on Aug. 16, 2024.

(51) Int. Cl.
*H01M 4/62* (2006.01)
*H01M 10/0569* (2010.01)
*H01M 10/44* (2006.01)

(52) U.S. Cl.
CPC ....... *H01M 4/628* (2013.01); *H01M 10/0569* (2013.01); *H01M 10/44* (2013.01); *H01M 2300/0025* (2013.01)

(58) Field of Classification Search
CPC .... H01M 4/628; H01M 10/569; H01M 10/44; H01M 2300/0025
See application file for complete search history.

(56) References Cited

U.S. PATENT DOCUMENTS

| | | |
|---|---|---|
| 2006/0121352 A1 | 6/2006 | Kejha |
| 2018/0375156 A1 | 12/2018 | Zhamu et al. |
| 2022/0263088 A1* | 8/2022 | Kim ..................... H01M 4/662 |
| 2024/0120543 A1 | 4/2024 | Rustomji et al. |

FOREIGN PATENT DOCUMENTS

WO WO-2022256320 A1 * 12/2022 .......... H01M 50/183

OTHER PUBLICATIONS

Mahne et al., "Electrochemical Oxidation of Lithium Carbonate Generates Singlet Oxygen", Angew. Chem. Int. Ed. 2018, 57, 5529-5333. (Year: 2018).*
Kaufman et al., "Surface Lithium Carbonate Influences Electrolyte Degradation via Reactive Oxygen Attack in Lithium Excess Cathode Materials", Chem. Mater. 2021, 33, 4170-4176 (Year: 2021).*
International Search Report for PCY/US2025/041890 dated Oct. 14, 2025 (11 pages).

* cited by examiner

*Primary Examiner* — Victoria H Lynch
(74) *Attorney, Agent, or Firm* — Manuel de la Cerra

(57) ABSTRACT

The use of reservoir replenishing additives to an electrochemical cell in conjunction with a liquefied gas electrolyte is described to maintain high capacity and high energy of a battery cell.

8 Claims, 4 Drawing Sheets

505 Lithium containing compound mixed into active material containing slurry

510 Slurry coated onto metallic film, forming an electrode

515 Electrode wound with second electrode and separator into an electrode assembly 520 Electrode assembly inserted into can, filled with electrolyte, and sealed, forming a battery cell.

525 Current applied to cell

530 Lithium containing compound is oxidized, releasing lithium cations into the electrolyte. Any products which are gaseous at standard pressure are also solubilized into the electrolyte. The pressure increase is minimal.

(Method 500)

| Compound | Oxidation Process |
|---|---|
| $Li_2CO_3$ | $Li_2CO_3 \rightarrow CO_2 + \frac{1}{2} O_2 + 2Li^+ + 2e^-$ |
| $LiHCO_3$ | $LiHCO_3 \rightarrow CO_2 + \frac{1}{2} O_2 + Li^+ + H^+ + 2e^-$ |
| $Li_2O$ | $Li_2O \rightarrow 2Li^+ + \frac{1}{2} O_2 + 2e^-$ |
| $Li_2O_2$ | $Li_2O_2 \rightarrow 2Li^+ + O_2 + 2e^-$ |
| $LiOH$ | $LiOH \rightarrow Li^+ + \frac{1}{2} O_2 + H^+ + 2e^-$ |
| $Li_3N$ | $Li_3N \rightarrow 3Li^+ + \frac{1}{2} N_2 + 3e^-$ |

FIG. 1

| Compound | Oxidation Potential (V vs. Li) |
|---|---|
| $Li_2CO_3$ | $3.8 - 4.1$ V |
| $Li_2O$ | $3.0 - 4.6$ V |

FIG. 2

| Cathode active material | Maximum operating voltage (V vs. Li/Li+) |
|---|---|
| $LiFePO_4$ | 3.7 V |
| $LiCoO_2$ | 4.7 V |
| $LiNi_xMn_yCo_{1-x-y}O2$ | 4.3 V |
| $LiMn_2O_4$ | 4.35 V |
| $LiNi_{0.5}Mn_{1.5}O_4$ | 5.0 V |

FIG. 3

| Compound | Lithium mass % |
|---|---|
| $LiFePO_4$ | 4.3 |
| $LiNi_{0.8}Mn_{0.1}Co_{0.1}O_2$ | 7.1 |
| $LiMn_{1.5}Ni_{0.5}O_4$ | 3.8 |
| $Li_2CO_3$ | 19 |
| $Li_2CO_2$ | 24 |
| $LiHCO_3$ | 10 |
| $LiHCO_2$ | 13 |
| $Li_2O$ | 46 |
| $Li_2O_2$ | 30 |
| $LiOH$ | 29 |
| $Li_3N$ | 60 |

Cathode Active Materials — $LiFePO_4$, $LiNi_{0.8}Mn_{0.1}Co_{0.1}O_2$, $LiMn_{1.5}Ni_{0.5}O_4$ Reservoir Replenishing Compounds — $Li_2CO_3$, $Li_2CO_2$, $LiHCO_3$, $LiHCO_2$, $Li_2O$, $Li_2O_2$, $LiOH$, $Li_3N$

FIG. 4

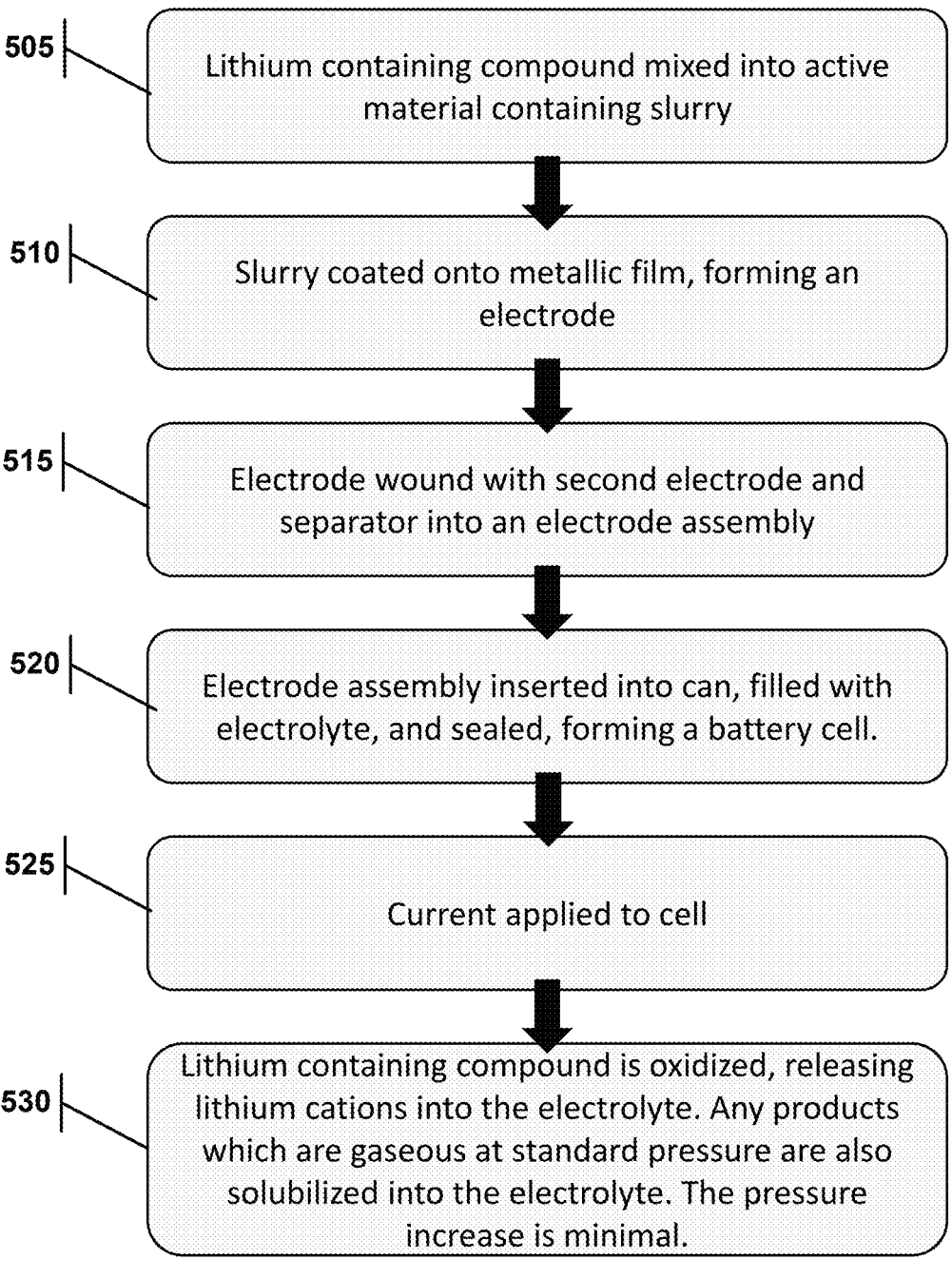

505 — Lithium containing compound mixed into active material containing slurry

510 — Slurry coated onto metallic film, forming an electrode

515 — Electrode wound with second electrode and separator into an electrode assembly

520 — Electrode assembly inserted into can, filled with electrolyte, and sealed, forming a battery cell.

525 — Current applied to cell

530 — Lithium containing compound is oxidized, releasing lithium cations into the electrolyte. Any products which are gaseous at standard pressure are also solubilized into the electrolyte. The pressure increase is minimal.

FIG. 5

(Method 500)

INCREASED CAPACITY BATTERY CELL USING RESERVOIR REPLENISHING ADDITIVES

CROSS-REFERENCE TO RELATED APPLICATIONS

This application claims priority from U.S. Provisional Application Ser. No. 63/684,297 filed on Aug. 16, 2024, which is incorporated herein by reference in its entirety.

TECHNICAL FIELD

This disclosure relates to the addition of chemical compounds to the battery cathode which may be oxidized during a first charge of the battery cell, thereby releasing oxidation products composed of a cation and a normally gaseous compound at standard temperature and pressure. The release of the cation can improve the capacity of the cell while the released gaseous compound may solubilize into the electrolyte solution.

BACKGROUND

Battery cells are often composed of an anode, a cathode, a separator, and a battery electrolyte. Most commonly, such as in lithium-ion batteries, the first charge cycle, commonly known as a formation cycle, will consume lithium cations via electrochemical reactions that build a solid electrolyte interphase (SEI) on the anode or cathode. Most frequently, these cations are consumed from the cathode, which serves as the lithium reservoir of the cell. The consumption of the lithium cations to form the SEI reduces the total capacity of the cell, because those cations consumed by the SEI are no longer mobile and cannot participate in the electrochemical charge and discharge processes. There is a need to increase the overall capacity of the cell to increase energy, reduce cost, reduce mass, and improve efficiency.

SUMMARY

Disclosed herein is a description of chemical additives, or reservoir replenishing additives, to the cathode of an electrochemical cell comprising a liquefied gas electrolyte, which, upon oxidation, may release oxidation products composed of a cation and a normally gaseous compound. The release of the cation can improve the capacity of the cell while the released gaseous compound may solubilize into the electrolyte solution. The additional cations released into the cell will improve cell capacity via replenishing the lithium consumed through the formation of the SEI. The additional oxidation products can be composed of chemical compounds which are normally gaseous under atmospheric pressure and at a room temperature. However, with the use of a liquefied gas electrolyte, these normally gaseous compounds may be solubilized into the liquefied gas electrolyte and not appreciably increase the pressure of the cell.

Using an ordinary liquid-based electrolyte, the oxidation of these chemical compounds would increase the pressure of the battery cell to unmanageable pressures which could lead to cell failure. The oxidation of these compounds can lead to gaseous materials that form bubbles, reducing wettability of the electrodes and increasing impedance of the cell and decreasing capacity. In certain cases, the resultant pressures could be so high that the vent on the cell may open and potentially cause electrical disconnect or ingress of atmospheric components leading to early cell failure. However, with a liquefied gas electrolyte, the cell is designed to withstand these pressures. Furthermore, a cell using a liquefied gas electrolyte is normally operating under an increased pressure, thus any release of gas inside the cell from these additives would cause only a modest increase in pressure relative to the nominal pressure of the electrolyte. If a cell using a liquid-based electrolyte were designed to withstand the increased pressures, the generation of gaseous compounds would not readily liquefy at the nominal pressure of a liquid electrolyte, which would lead to bubble formation, dry-out of the electrodes, and subsequent cell failure.

Such chemical compounds which can be added to the cathode could be $Li_2CO_3$, $LiHCO_3$, $Li_3N$, $Li_2O$, $Li_2O_2$, or LiOH. In other aspects of the disclosed technology, the lithium in these compounds is replaced by another cation such as sodium, potassium, calcium, aluminum, zinc, magnesium, or others for similar benefits in a sodium, potassium, calcium, aluminum, zinc, or magnesium type battery device. These compounds can be oxidized to release lithium and compounds which are gaseous under standard conditions (293.15 K and 1 atmosphere of pressure) such as $CO_2$, $N_2$, or $O_2$. These gaseous compounds could readily be solubilized into the liquefied gas electrolyte, resulting in only a moderate pressure increase of the cell and generating no dry spots within the cell, allowing for continued optimal cycling conditions with no impedance increase or capacity decrease.

In a lithium-ion cell, normal SEI formation during the first charge cycle can result in loss of lithium inventory, as high as 20%, but typically closer to 10% or 5%. Thus, if the cell contained additional chemical compounds which could replenish lithium inventory by the same amount, such as 1%, 2%, 4%, 8%, 12%, 16%, or 20%, then the cell would result in having a higher capacity, resulting in higher energy.

Of course, the similar invention may be used in a variety of cell chemistries where the cation is sodium, potassium, calcium, aluminum, zinc, magnesium, and others.

The combination of the use of a liquefied gas electrolyte and additional chemical compounds to the cathode to replenish the lost capacity of a cell without a deleterious increase in pressure is a unique combination which has not been described previously. The use of these additional chemical compounds with a traditional electrolyte (i.e., without the use of a liquefied gas electrolyte) would be harmful, rather than beneficial, to performance.

Additional aspects, alternatives and variations as would be apparent to persons of skill in the art are also disclosed herein and are specifically contemplated as included as part of the disclosed technology. The disclosed technology is set forth only in the claims as allowed by the patent office in this or related applications, and the following summary descriptions of certain examples are not in any way to limit, define or otherwise establish the scope of legal protection.

BRIEF DESCRIPTION OF THE DRAWINGS

The disclosed technology can be better understood with reference to the following figures. The components within the figures are not necessarily to scale, emphasis instead being placed on clearly illustrating example aspects of the disclosed technology. In the figures, like reference numerals designate corresponding parts throughout the different views or embodiments. Furthermore, various features of different disclosed embodiments can be combined to form additional embodiments, which are part of this disclosure. It will be understood that certain components and details may not appear in the figures to assist in more clearly describing the disclosed technology.

FIG. 1 presents the typical oxidation process for a variety of lithium compounds.

FIG. 2 presents the typical oxidation for a set of lithium compounds.

FIG. 3 presents the typical maximum operation potential for some standard lithium-based cathodes.

FIG. 4 presents the lithium mass of a variety of lithium compounds used as cathode active materials and reservoir replenishing materials.

FIG. 5 presents a method for manufacturing an electro-chemical cell with a reservoir replenishing material.

DETAILED DESCRIPTION

Figure 6A:
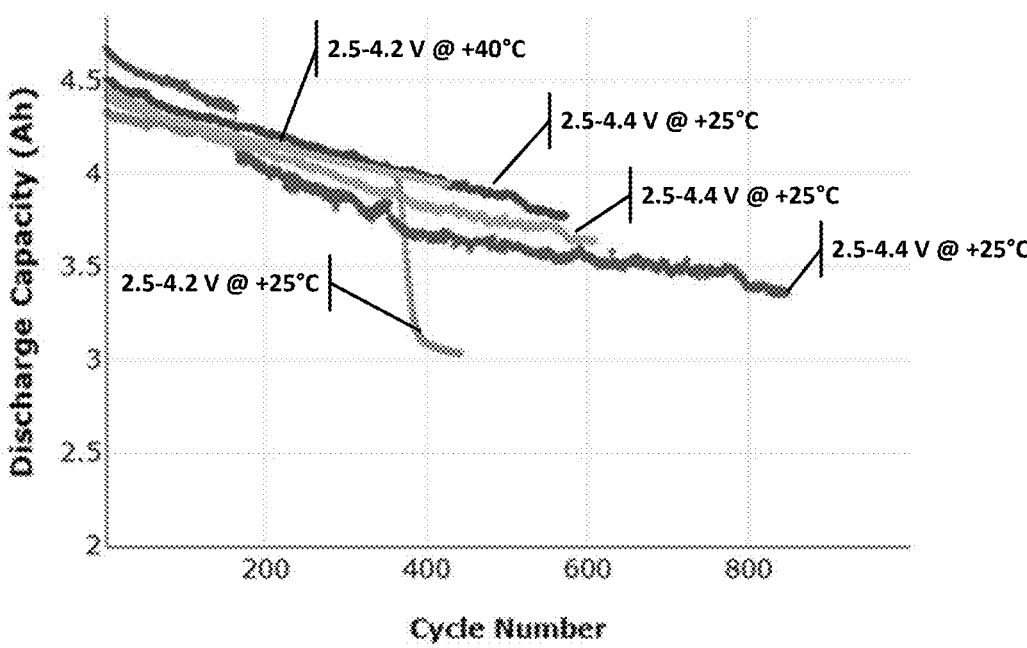
FIG. 6A presents cycle data (discharge capacity) of identical cells with $Li_2CO_3$ contained on the cathode, showing cycling at 4.2 V, 4.4 V, +25° C., and +40° C.

Reference is made herein to some specific examples of the present invention, including any best modes contemplated by the inventor for carrying out the disclosed technology. Examples of these specific embodiments are illustrated in the accompanying figures. While the disclosed technology is described in conjunction with these specific embodiments, it will be understood that it is not intended to limit the disclosed technology to the described or illustrated embodiments. To the contrary, it is intended to cover alternatives, modifications, and equivalents as may be included within the spirit and scope of the disclosed technology as defined by the appended claims.

In the following description, numerous specific details are set forth to provide a thorough understanding of the present invention. Example embodiments of the present invention may be implemented without some or all of these specific details. In other instances, process operations well known to persons of skill in the art have not been described in detail in order not to obscure unnecessarily the present invention. Various techniques and mechanisms of the present invention will sometimes be described in singular form for clarity. However, it should be noted that some embodiments include multiple iterations of a technique or multiple mechanisms unless noted otherwise. Similarly, various steps of the methods shown and described herein are not necessarily performed in the order indicated, or performed at all in certain embodiments. Accordingly, some implementations of the methods discussed herein may include more or fewer steps than those shown or described. Further, the techniques and mechanisms of the present invention will sometimes describe a connection, relationship or communication between two or more entities. It should be noted that a connection or relationship between entities does not necessarily mean a direct, unimpeded connection, as a variety of other entities or processes may reside or occur between any two entities. Consequently, an indicated connection does not necessarily mean a direct, unimpeded connection unless otherwise noted.

Disclosed herein is a description of "reservoir replenishing chemical additives" to the cathode of an electrochemical cell, comprising a liquefied gas electrolyte, in which, upon oxidation, may release oxidation products composed of a cation (e.g., lithium, sodium, potassium, calcium, magnesium, etc.) and a compound which is ordinarily gaseous under standard pressure and room temperature. The release of the cation can improve the capacity of the cell (increasing energy and performance of the cell) and the released gaseous compound may solubilize into the electrolyte solution without creating gas bubbles within the cell.

After electrolyte injection, electrochemical cells (e.g., lithium-ion batteries) generally undergo a charging process, passing a current through the cell, in a "formation process" in which a "solid electrolyte interphase" (SEI) is created on the anode or cathode. This SEI is formed in part with the cation from the electrolyte. Because the only reservoir for the cation within the cell is from the cathode, this SEI "locks up" these cations and prevents full utilization of the cathode structure, thereby reducing the energy of the cell. Typically, the formation process requires ~10% of the cations from the cathode structure, thereby reducing cell capacity by ~10% from nominal. This lost quantity can vary higher and lower depending on cell balancing, electrodes used, temperature, electrolyte chemistry, etc. This percent loss can vary from about 1%, 5%, 8%, 9%, 10%, 11%, 12%, 15%, 20%, 25%, or 30%.

Typical cathodes used in a lithium battery cell can include a cathode active material such as lithium iron phosphate, lithium iron manganese phosphate, lithium manganese phosphate, lithium cobalt phosphate, lithium nickel phosphate, lithium nickel manganese cobalt oxide, lithium manganese oxide, lithium nickel oxide, lithium cobalt oxide, lithium nickel cobalt aluminum oxide, lithium manganese nickel oxide, lithium manganese rock salt, copper fluoride, iron fluoride, cobalt fluoride, nickel fluoride, manganese fluoride, sulfur, oxygen, carbon, etc. These cathodes may be of conversion type or intercalation type. The intercalation type cathodes can have crystal structures such as olivine, layered, or spinel. These cathodes may also have analogues having different cations such as sodium, calcium, manganese, potassium, etc. Other conversion type cathodes also exist in which there is a chemical conversion such as a sulfur cathode, metal fluoride cathode, carbon oxygen cathode, or others.

With a conventional liquid electrolyte, the oxidation of the reservoir replenishing chemical additives would create a gaseous molecular component which would create gas bubbles, creating dry spots within the cell and lowering power, efficiency, and life of the cell. It can be appreciated that the gas components may have a limited solubility within the liquid electrolyte, but after saturation, considerable gas bubble generation and an increase in pressure will be observed. For example, carbon dioxide often has a solubility limit of 1 wt % or less in a conventional liquid electrolyte. Further, the gas generation may lead to a catastrophic increase in pressure within the cell. This gas pressure increase can be greater than 10%, 15%, 20%, 50%, or 100%. This increase in pressure often activates the cell vent or current interrupt device (CID), rendering the cell useless. A degassing step may be required to continue operation of the cell.

Using a liquefied gas electrolyte, the oxidation of the reservoir replenishing chemical additives would release the same gaseous molecular components, however, under the nominal operating pressure of the liquefied gas electrolyte, would not create gas bubbles or a considerable increase in pressure, on the order of 1~5% pressure increase. Upon generation, these molecular components would simply solubilize into the liquefied gas electrolyte in the liquid phase. Furthermore, the increase in pressure upon generation of these components would be negligible. A pressure increase of less than 10% of nominal pressure at room temperature would be expected depending on electrolyte formulation and the amount of reservoir-replenishing additive used. Thus, the cell can continue to operate well without activating a current interrupt device or venting.

The oxidation of these reservoir replenishing additives may be easily accomplished by mixing the solid component into the cathode electrode coating. The cathode mixture is often comprised of a binder, conductive carbon, and cathode active material to which one or more reservoir replenishing chemical additives may be added. The cathode mixture can further contain a solvent to create a slurry which can be used to coat the current collector foil. FIG. 5 presents a method 500 for manufacturing an electrochemical cell with a reservoir replenishing material. In step 505, a lithium-containing reservoir replenishing material is mixed with the active material containing slurry. The slurry is then coated on a metallic film to form an electrode in step 510. The electrode is wound with a second electrode and a separator to form an electrode assembly in step 515. This assembly is placed into the housing (or can) filled with an electrolyte and sealed at step 520. When current is applied to the sealed cell (step 525) the lithium-containing reservoir replenishing material is oxidized, releasing cations in the electrolyte (step 530).

Upon a charging process, the reservoir replenishing additives may be taken above their oxidation potential. Because the additive is in electrical contact within the cathode (through current collector and the carbon within the coating), it can allow for efficient oxidation of the component.

Such reservoir replenishing chemical additives which can be added to the cathode could include $Li_2CO_3$, $LiHCO_3$, $Li_3N$, $Li_2O$, $Li_2O_2$, LiOH, or a mixture of these compounds. In other aspects of the disclosed technology, the lithium in these compounds is replaced by another cation such as sodium, potassium, magnesium, or others. These compounds can be oxidized to release lithium and a normally gaseous compound such as $CO_2$, $N_2$, $O_2$, $N_2O$, $NO_2$, etc. FIG. 1 describes the typical oxidation process for the compounds. These gaseous compounds could readily be solubilized into the liquefied gas electrolyte, resulting in only a moderate pressure increase of the cell and generating no dry spots within the cell allowing for continued optimal cycling conditions. This moderate increase in pressure is preferably less than 10% of the pressure before the oxidation process. Additional reservoir replenishing additives not described here can similarly be used in a similar manner to replenish the cation reservoir and capacity of the cell.

These reservoir replenishing additives often require a high voltage to be oxidized. FIG. 2 shows typical oxidation for a set of example compounds. Cathodes often do not operate at these high potentials. FIG. 3 shows typical maximum operation potential for some standard cathodes. Because the cathode potential must reach the oxidation potential of the reservoir replenishing additives, the use of some of these reservoir replenishing additives may be well suited or poorly suited for use with certain cathode active materials. For example, the maximum voltage for $LiFePO_4$ (lithium iron phosphate) is 3.6 V vs. Li; this would be well suited to use $Li_3N$ (lithium nitride), having an oxidation potential of about 1 V vs. Li but poorly suited to use $Li_2CO_3$ (lithium carbonate), having an oxidation potential of about 3.8 to 4.1 V vs. Li. However, the oxidation of these compounds may be kinetically slow at the thermodynamic oxidation potential but can have faster oxidation at elevated temperatures or potentials.

If a cell was charged such that the potential of the cathode was taken above the typical maximum potential of the cathode active material, there may be harmful effects such as electrolyte or active cathode material degradation. In some instances, a short overcharge to oxidize the reservoir replenishing additives may be acceptable and can be suitable for manufacturing.

The cell temperature may be modified to oxidize the reservoir replenishing additives and reduce the possibility of cathode or electrolyte degradation. A lower temperature may slow electrolyte or cathode degradation but still allow for oxidation of reservoir replenishing additives at higher potentials. A higher temperature may also allow for a lower activation potential for reservoir replenishing additives, thus not exposing the electrolyte or cathode to potentials at which the materials will undergo degradation. For example, increasing the temperature during the first formation cycle of the cell can help accelerate the oxidation of these compounds.

The combination of the use of a liquefied gas electrolyte and additional chemical compounds to the cathode to replenish the lost capacity of a cell without a deleterious increase in pressure is a unique combination which has not been described previously.

Of course, the addition of reservoir replenishing additives will occupy volume within the cathode coating which may otherwise be used to add more cathode active material. However, the reservoir replenishing additives can also be more efficient in mass and volume per unit cation, as shown in FIG. 4. Further, cells with a reservoir-replenishing additive may also be densified higher, yielding a higher areal capacity electrode. After first charge and oxidation of the reservoir-replenishing additive, the additive is oxidized to the cation and gas molecule which solubilizes into the liquefied gas electrolyte thereby creating a void space in the electrode closer to nominal void space to allow for maximum diffusion of electrolyte within the cathode and optimal performance.

The same concept may also be used in a conventional liquid electrolyte system, as well. In this system, the cell may be "degassed" after the oxidation process of the reservoir-replenishing additive. However, the degassing step may also add cost to the manufacturing and is not desirable. Using a liquefied gas electrolyte would remove the degassing step requirement and allow for a cheaper cell with higher performance.

Furthermore, the gaseous components which are solubilized into the electrolyte may also migrate to the anode and be reduced at the anode surface aiding in generating a beneficial SEI layer on the anode surface. For instance, $CO_2$ generated from the oxidation of $Li_2CO_3$ on the cathode may be again reduced back to $Li_2CO_3$ at the anode surface, generating a low impedance and stable SEI. This is more beneficial than simply mixing $Li_2CO_3$ material into a slurry and coating together with an anode material since this does not give uniform and nanometer coverage through the anode surface. Similarly, $Li_3N$ can be added to the cathode slurry or coating, oxidized during the first or subsequent cycles, and oxidized generating $N_2$ gas and Li cation. The $N_2$ can solubilize into the liquefied gas electrolyte, increasing the pressure of the electrolyte. The Li cation can then replenish the charge consumed to form the solid electrolyte interphase on the anode, thus increasing the cell capacity. The electrochemical oxidation on the cathode surface and the reduction on the anode surface generates a very highly uniform and stable SEI interphase.

The electrochemical device or battery cell may comprise the ionically conducting liquefied gas electrolyte comprising a mixture of one or more solid or liquid salts, a solution of one or more liquefied gas solvents, and one or more additives, wherein the liquefied gas solvent comprises at least a first component that has a vapor pressure above 100 kPa at a room temperature of 293.15 K and the device is housed in an enclosure which allows the ionically conducting electrolyte to maintain a pressurized condition higher than 100 kPa at 293.15 K such that the electrolyte is at least partially in a liquid phase within the cell housing.

In some embodiments, the liquefied gas electrolyte may comprise in part dimethyl ether, methyl ethyl ether, fluoromethane, difluoromethane, trifluoromethane, fluoroethane, tetrafluoroethane, pentafluoroethane, 1,1-difluoroethane, 1,2-difluoroethane, 1,1,1-trifluoroethane, 1,1,2-trifluoroethane, 1,1,1,2-tetrafluoroethane, 1,1,2,2-tetrafluoroethane, pentafluoroethane, chloromethane, chloroethane, thionyl fluoride, thionyl chloride fluoride, phosphoryl fluoride, phosphoryl chloride fluoride, sulfuryl fluoride, sulfuryl chloride fluoride, 1-fluoropropane, 2-fluoropropane, 1,1-difluoropropane, 1,2-difluoropropane, 2,2-difluoropropane, 1,1,1-trifluoropropane, 1,1,2-trifluoropropane, 1,2,2-trifluoropropane, fluoroethene, cis-1,2-difluoroethene, 1,1-difluoroethene, 1-fluoropropene, propene, chlorine, chloromethane, bromine, iodine, ammonia, methyl amine, dimethyl amine, trimethyl amine, molecular oxygen, molecular nitrogen, carbon monoxide, carbon dioxide, sulfur dioxide, methyl vinyl ether, nitrous oxide, nitrogen dioxide, nitrogen oxide, carbon disulfide, hydrogen fluoride, hydrogen chloride, methane, ethane, propane, n-butane, isobutane, cyclopropane, ethene, propene, butene, cyclobutene, acetylene, 3,3,3-trifluoropropene, 2,3,3,3-tetrafluoropropene, trans-1,3,3,3-tetrafluoropropene, trans-1,1,1,4,4,4-hexafluoro-2-butene, cis-1,1,1,4,4,4-hexafluoro-2-butene, 1,1-difluoroethene, 1,2-difluoroethene, 1,1-dichloroethene, vinyl chloride, vinyl fluoride, hexafluoropropene, hexafluorobutadiene, trichloroethene, dichloroethene, chlorofluoroethene, (Z)-1-chloro-2,3,3,3-tetrafluoropropene, trans-1-chloro-3,3,3-trifluoropropene, 3,3,4,4,4-pentafluoro-1-butene, hydrofluoroolefins (HFOs), hydrochloroolefins (HCOs), hydrochlorofluoroolefins (HCFOs), perfluoroolefins (PFOs), or perchloroolefins (PCOs), perfluoroolefins, methane, ethane, propane, n-butane, iso-butane, cyclopropane, ethene, propene, butene, cyclobutane, cyclobutene, acetylene, pentane, hexane, heptane, octane, cyclopentane, cyclohexane, cycloheptane, cyclooctane, isomers thereof, or a combination thereof.

In some embodiments, lithium-, sodium-, zinc-, calcium-, magnesium-, aluminum-, or titanium-based salts are used. Further, electrolyte or solvent solution containing one or more liquefied gas solvents may be combined with one or more salts, including one or more of lithium bis(trifluoromethanesulfonyl)imide (LiTFSI), lithium hexafluorophosphate (LiPF$_6$), lithium perchlorate (LiClO$_4$), lithium hexafluoroarsenate (LiAsF$_6$), lithium tetrachloroaluminate (LiAlCl$_4$), lithium tetragaliumaluminate, lithium bis(oxalato)borate (LiBOB), lithium hexafluorostannate (LiSnF$_4$), lithium difluoro(oxalato)borate (LiDFOB), lithium bis(fluorosulfonyl)imide (LiFSI), lithium aluminum fluoride (LiAlF$_3$), lithium nitrate (LiNO$_3$), lithium trifluoromethanesulfonate, lithium tetrafluoroborate (LiBF$_4$), lithium difluorophosphate, lithium tetrafluoro(oxalato)phosphate, lithium difluorobis(oxalato)phosphate, lithium borate, lithium oxalate, lithium thiocyanate, lithium tetrachlorogallate, lithium chloride, lithium bromide, lithium iodide, lithium carbonate, lithium fluoride, lithium oxide, lithium hydroxide, lithium nitride, lithium super oxide, lithium azide, lithium deltate, dilithium squarate, lithium croconate dihydrate, dilithium rhodizonate, lithium ketomalonate, lithium diketosuccinate or any corresponding salts with a positively charged sodium or magnesium cation substituted for the lithium cation, or any combinations thereof. Further useful salts include those with positively charged cations such as tetramethylammonium, tetraethylammonium, tetrapropylammonium, tetrabutylammonium, triethylmethylammonium, spiro-(1,1')-bipyrrolidinium, 1,1-dimethylpyrrolidinium, and 1,1-diethylpyrrolidinium, N,N-diethyl-N-methyl-N(2-methoxyethyl)ammonium, N,N-Diethyl-N-methyl-N-propylammonium, N,N-dimethyl-N-ethyl-N-(3-methoxypropyl)ammonium, N,N-Dimethyl-N-ethyl-N-benzylAmmonium, N, N-Dimethyl-N-ethyl-N-phenylethylammonium, N-Ethyl-N, N-dimethyl-N-(2-methoxyethyl)ammonium, N-Tributyl-N-methylammonium, N-Trimethyl-N-hexylammonium, N-Trimethyl-N-butylammonium, N-Trimethyl-N-propylammonium, 1,3-Dimethylimidazolium, 1-(4-Sulfobutyl)-3-methylimidazolium, 1-Ally1-3H-imidazolium, 1-Butyl-3-methylimidazolium, 1-Ethyl-3-methylimidazolium, 1-Hexyl-3-methylimidazolium, 1-Octyl-3-methylimidazolium, 3-Methyl-1-propylimidazolium, H-3-Methylimidazolium, Trihexyl(tetradecyl)phosphonium, N-Butyl-N-methylpiperidinium, N-Propyl-N-methylpiperidinium, 1-Butyl-1-Methylpyrrolidinium, 1-Methyl-1-(2-methoxyethyl) pyrrolidinium, 1-Methyl-1-(3-methoxypropyl) pyrrolidinium, 1-Methyl-1-octylpyrrolidinium, 1-Methyl-1-pentylpyrrolidinium, or N-methylpyrrolidinium paired with negatively charged anions such as acetate, bis(fluorosulfonyl)imide, bis(oxalato)borate, bis(trifluoromethanesulfonyl) imide, bromide, chloride, dicyanamide, diethyl phosphate, hexafluorophosphate, hydrogen sulfate, iodide, methanesulfonate, methyl-phophonate, tetrachloroaluminate, tetrafluoroborate, and trifluoromethanesulfonate. Alternative or additional embodiments described herein provide an electrolyte composition comprising one or more of the features of the foregoing description or of any description elsewhere herein.

In some embodiments the liquefied gas electrolyte may comprise an additive such as a non-cyclic carbonate, cyclic carbonate, ether, cyclic-ether, nitrile, or an organophosphate containing compound. These additives may include dimethyl carbonate, ethyl methyl carbonate, propyl methyl carbonate, butyl methyl carbonate, diethyl carbonate, propyl ethyl carbonate, butyl ethyl carbonate, dipropyl carbonate, propyl butyl carbonate, dibutyl carbonate, fluoromethyl methyl carbonate, difluoromethyl methyl carbonate, trifluoromethyl methyl carbonate, bis(fluoromethyl) carbonate, bis(difluoromethyl)carbonate, bis(trifluoromethyl)carbonate, fluoromethyl ethyl carbonate, difluoromethyl ethyl carbonate, trifluoromethyl ethyl carbonate, fluoroethyl ethyl carbonate, difluoroethyl ethyl carbonate, trifluoroethyl ethyl carbonate, tetrafluoroethyl ethyl carbonate, pentafluoroethyl ethyl carbonate, hexafluoroethyl ethyl carbonate, bis(fluoroethyl) carbonate, bis(difluoroethyl)carbonate, bis(trifluoroethyl)carbonate, bis(tetrafluoroethyl) carbonate, bis(pentafluoroethyl)carbonate, bis(hexafluoroethyl)carbonate, vinyl carbonate, ethylene carbonate, propylene carbonate, 1,2-butylene carbonate, trans-butylene carbonate, fluoroethylene carbonate, difluoroethylene carbonate, trifluoroethylene carbonate, tetrafluoroethylene carbonate, chloroethylene carbonate, dichloroethylene carbonate, trichloroethylene carbonate, tetrachloroethylene carbonate, fluoromethyl ethylene carbonate, difluoromethyl ethylene carbonate, trifluoromethyl ethylene carbonate, bis(fluoromethyl)ethylene carbonate, bis(difluoromethyl)ethylene carbonate, bis (trifluoromethyl)ethylene carbonate, methyl propyl ether, methyl butyl ether, diethyl ether, ethyl propyl ether, ethyl butyl ether, dipropyl ether, propyl butyl ether, dibutyl ether, ethyl vinyl ether, divinyl ether, glyme, diglyme, triglyme, tetraglyme, 1,1,2,2-Tetrafluoro-3-(1,1,2,2-tetrafluoroethoxy)-propane, trifluoro(trifluoromethoxy)methane, perfluoroethyl ether, fluoromethyl methyl ether, difluoromethyl methyl ether, trifluoromethyl methyl ether, bis(fluoromethyl)ether, bis(difluoromethyl)ether, fluoroethyl methyl ether, difluoroethyl methyl ether, trifluoroethyl methyl ether, bis (fluoroethyl)ether, bis(difluoroethyl)ether, bis(trifluoroethyl)ether, 2-fluoroethoxymethoxyethane, 2,2 difluoroethoxymethoxyethane, methoxy-2,2,2-trifluoroethoxyethane, ethoxy-2-fluoroethoxyethane, 2,2-difluoroethoxyethoxyethane, ethoxy-2,2,2-trifluoroethoxyethane, methyl nanofluorobutyl ether, ethyl nanofluorobutyl ether, 2 fluoroethoxymethoxyethane, 2,2-difluoroethoxymethoxyethane, methoxy 2,2,2 trifluoroethoxyethane, ethoxy-2-fluoroethoxyethane, 2,2-difluoroethoxyethoxyethane, ethoxy 2,2,2-trifluoroethoxyethane, bis(trifluoro)methyl ether, dimethylether, methyl ethyl ether, methyl vinyl ether, perfluoromethyl-vinylether, propylene oxide, tetrahydrofuran, tetrahydropyran, furan, 12-crown-4, 12-crown-5, 18-crown-6, 2-Methyltetrahydrofuran, 1,3-Dioxolane, 1,4-dioxolane, 2-methyloxolane, (1,2-propylene oxide), ethylene oxide, octafluorotetrahydrofuran, acetonitrile, propionitrile, butanenitrile, pentanenitrile, hexanenitrile, hexanedinitrile, pentanedinitrile, butanedinitrile, propanedinitrile, ethanedinitrile, isovaleronitrile, benzonitrile, phenylacetonitrile, cyanogen chloride, hydrogen cyanide, ethanedinitrile, trimethylphosphate, triethylphosphate, isomers thereof, and any combination thereof.

Example 1

Figure 6B:
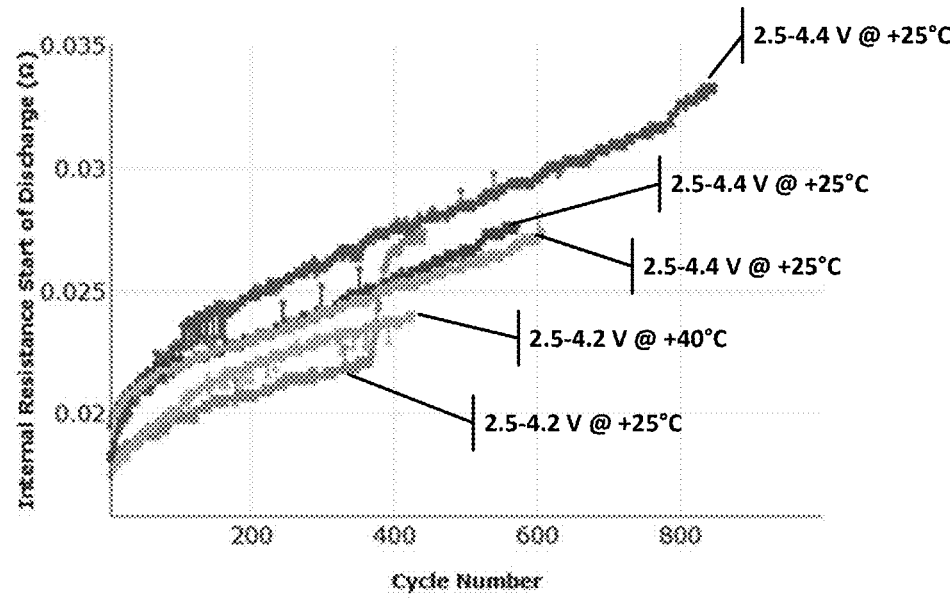
FIG. 6B presents cycle data (internal resistance) of identical cells with $Li_2CO_3$ contained on the cathode, showing cycling at 4.2 V, 4.4 V, +25° C., and +40° C.

A 4.5 Ah cell with a graphite anode and NMC cathode was built and injected with liquefied gas electrolyte. The cathode contained lithium carbonate additive. Upon cycling (shown in FIGS. 6A and 6B), it was found that the cell which was cycled at 4.2 V at +25° C. has a shorter life than the cells which are cycled at 4.2 V at +45° C. or cells cycled at 4.4 V at +25° C. This demonstrates the ability for the cell to oxidize the lithium carbonate additive, release $CO_2$ and the lithium cation, replenishing the capacity of the cell. The $CO_2$ can also migrate to the anode, reduce to lithium carbonate and further passivate the anode for improved cycle life.

While this document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

The invention claimed is:

1. A method of forming an electrochemical cell comprising a cathode that includes a reservoir-replenishing additive and a liquefied-gas electrolyte, the method comprising: during formation, charging the electrochemical cell to a voltage sufficient to oxidize at least a portion of the additive while maintaining a pressure increase of ≤10% relative to pre-charge pressure at 293.15 K.

2. The method of claim 1, further comprising holding at 4.3-4.5 V for ≤60 min at 30-50° C. to complete oxidation of $Li_2CO_3$.

3. An electrochemical cell comprising:
   a housing configured to maintain an internal pressure of at least 100 kPa at 293.15 K;
   an anode;
   a cathode comprising a cathode active material and 0.1-10 wt % of a reservoir-replenishing additive selected from $Li_2CO_3$, $Li_3N$, $Li_2O$, $Li_2O_2$, or LiOH; and
   a liquefied-gas electrolyte comprising a liquefied-gas solvent and a lithium salt;
   wherein, during an initial charge, the reservoir-replenishing additive oxidizes to release $Li^+$ and a gaseous species selected from $CO_2$, $N_2$, or $O_2$, the gaseous species dissolving in the liquefied-gas electrolyte without bubble formation, and a pressure increase is ≤10% relative to a pre-charge pressure measured at 293.15 K.

4. The electrochemical device of claim 3, wherein sufficient reservoir-replenishing additive is added to the cathode to replenish above 1% of the electrochemical device capacity.

5. The electrochemical device of claim 3, wherein the electrochemical device exhibits a first-cycle coulombic efficiency ≥92%.

6. The electrochemical device of claim 3, wherein the oxidation of the reservoir-replenishing additive occurs at a cathode potential of 3.8-4.6 V vs. Li/Li$^+$.

7. The electrochemical device of claim 3, wherein the liquefied gas electrolyte comprises one or more of dimethyl ether, methyl ethyl ether, fluoromethane, difluoromethane, trifluoromethane, fluoroethane, tetrafluoroethane, pentafluoroethane, 1,1-difluoroethane, 1,2-difluoroethane, 1,1,1-trifluoroethane, 1,1,2-trifluoroethane, 1,1,1,2-tetrafluoroethane, 1,1,2,2-tetrafluoroethane, pentafluoroethane, chloromethane, chloroethane, thionyl fluoride, thionyl chloride fluoride, phosphoryl fluoride, phosphoryl chloride fluoride, sulfuryl fluoride, sulfuryl chloride fluoride, 1-fluoropropane, 2-fluoropropane, 1,1-difluoropropane, 1,2-difluoropropane, 2,2-difluoropropane, 1,1,1-trifluoropropane, 1,1,2-trifluoropropane, 1,2,2-trifluoropropane, fluoroethene, cis-1,2-difluoroethene, 1,1-difluoroethene, 1-fluoropropene, propene, chlorine, chloromethane, bromine, iodine, ammonia, methyl amine, dimethyl amine, trimethyl amine, molecular oxygen, molecular nitrogen, carbon monoxide, carbon dioxide, sulfur dioxide, methyl vinyl ether, nitrous oxide, nitrogen dioxide, nitrogen oxide, carbon disulfide, hydrogen fluoride, hydrogen chloride, methane, ethane, propane, n-butane, isobutane, cyclopropane, ethene, propene, butene, cyclobutene, acetylene, 3,3,3-trifluoropropene, 2,3,3,3-tetrafluoropropene, trans-1,3,3,3-tetrafluoropropene, trans-1,1,1,4,4,4-hexafluoro-2-butene, cis-1,1,1,4,4,4-hexafluoro-2-butene, 1,1-difluoroethene, 1,2-difluoroethene, 1,1-dichloroethene, vinyl chloride, vinyl fluoride, hexafluoropropene, hexafluorobutadiene, trichloroethene, dichloroethene, chlorofluoroethene, (Z)-1-chloro-2,3,3,3,-tetrafluoropropene, trans-1-chloro-3,3,3-trifluoropropene, 3,3,4,4,4-pentafluoro-1-butene, hydrofluoroolefins (HFOs), hydrochloroolefins (HCOs), hydrochlorofluoroolefins (HCFOs), perfluoroolefins (PFOs), or perchloroolefins (PCOs), methane, ethane, propane, n-butane, iso-butane, cyclopropane, cyclopropane, ethene, propene, butene, cyclobutane, cyclobutene, acetylene, pentane, hexane, heptane, octane, cyclopentane, cyclohexane, cycloheptane, cyclooctane, isomers thereof, or a combination thereof; and wherein the salt comprises one or more of lithium bis (trifluoromethanesulfonyl)imide (LiTFSI), lithium hexafluorophosphate (LiPF$_6$), lithium perchlorate (LiClO$_4$), lithium hexafluoroarsenate (LiAsF$_6$), lithium tetrachloroaluminate (LiAlCl$_4$), lithium tetragalliumaluminate, lithium bis(oxalato)borate (LiBOB), lithium hexafluorostannate (LiSnF$_4$), lithium difluoro(oxalato)borate (LiDFOB), lithium bis(fluorosulfonyl)imide (LiFSI), lithium aluminum fluoride (LiAlF$_3$), lithium nitrate (LiNO$_3$), lithium trifluoromethanesulfonate, lithium tetrafluoroborate (LiBF$_4$), lithium difluorophosphate, lithium tetrafluoro(oxalato)phosphate, lithium difluorobis(oxalato)phosphate, lithium borate, lithium oxalate, lithium thiocyanate, lithium tetrachlorogallate, lithium chloride, lithium bromide, lithium iodide, lithium carbonate, lithium fluoride, lithium oxide, lithium hydroxide, lithium nitride, lithium superoxide, lithium azide, lithium deltate, dilithium squarate, lithium croconate dihydrate, dilithium rhodizonate, lithium ketomalonate, lithium diketosuccinate or any corresponding salts with a positively charged sodium or magnesium cation substituted for the lithium cation, or any combinations thereof, tetramethylammonium, tetraethylammonium, tetrapropylammonium, tetrabutylammonium, triethylmethylammonium, spiro-(1,1')-bipyrrolidinium, 1,1-dimethylpyrrolidinium, and 1,1-diethylpyrrolidinium, N,N-diethyl-N-methyl-N-(2-methoxyethyl) ammonium, N,N-Diethyl-N-methyl-N-propylammonium, N,N-dimethyl-N-ethyl-N-(3-methoxypropyl) ammonium, N,N-Dimethyl-N-ethyl-N-benzylAmmonium, N,N-Dimethyl-N-ethyl-N-phenylethylammonium, N-Ethyl-N,N-dimethyl-N-(2-methoxyethyl) ammonium, N-Tributyl-N-methylammonium, N-Trimethyl-N-hexylammonium, N-Trimethyl-N-butylammonium, N-Trimethyl-N-propylammonium, 1,3-Dimethylimidazolium, 1-(4-Sulfobutyl)-3-methylimidazolium, 1-Allyl-3H-imidazolium, 1-Butyl-3-methylimidazolium, 1-Ethyl-3-methylimidazolium, 1-Hexyl-3-methylimidazolium, 1-Octyl-3-methylimidazolium, 3-Methyl-1-propylimidazolium, H-3-Methylimidazolium, Trihexyl(tetradecyl)phosphonium, N-Butyl-N-methylpiperidinium, N-Propyl-N-methylpiperidinium, 1-Butyl-1-Methylpyrrolidinium, 1-Methyl-1-(2-methoxyethyl) pyrrolidinium, 1-Methyl-1-(3-methoxypropyl) pyrrolidinium, 1-Methyl-1-octylpyrrolidinium, 1-Methyl-1-pentylpyrrolidinium, or N-methylpyrrolidinium paired with negatively charged anions such as acetate, bis(fluorosulfonyl)imide, bis(oxalato)borate, bis(trifluoromethanesulfonyl) imide, bromide, chloride, dicyanamide, diethyl phosphate, hexafluorophosphate, hydrogen sulfate, iodide, methanesulfonate, methyl-phophonate, tetrachloroaluminate, tetrafluoroborate, or trifluoromethanesulfonate.

8. The electrochemical device of claim 3, wherein the liquefied gas electrolyte further comprises one or more additives selected from dimethyl carbonate, ethyl methyl carbonate, propyl methyl carbonate, butyl methyl carbonate, diethyl carbonate, propyl ethyl carbonate, butyl ethyl carbonate, dipropyl carbonate, propyl butyl carbonate, dibutyl carbonate, fluoromethyl methyl carbonate, difluoromethyl methyl carbonate, trifluoromethyl methyl carbonate, bis (fluoromethyl)carbonate, bis(difluoromethyl)carbonate, bis (trifluoromethyl)carbonate, fluoromethyl ethyl carbonate, difluoromethyl ethyl carbonate, trifluoromethyl ethyl carbonate, fluoroethyl ethyl carbonate, difluoroethyl ethyl carbonate, trifluoroethyl ethyl carbonate, tetrafluoroethyl ethyl carbonate, pentafluoroethyl ethyl carbonate, hexafluoroethyl ethyl carbonate, bis(fluoroethyl)carbonate, bis(difluoroethyl)carbonate, bis(trifluoroethyl) carbonate, bis(tetrafluoroethyl)carbonate, bis(pentafluoroethyl)carbonate, bis (hexafluoroethyl)carbonate, vinyl carbonate, ethylene carbonate, propylene carbonate, 1,2-butylene carbonate, trans-butylene carbonate, fluoroethylene carbonate, difluoroethylene carbonate, trifluoroethylene carbonate, tetrafluoroethylene carbonate, chloroethylene carbonate, dichloroethylene carbonate, trichloroethylene carbonate, tetrachloroethylene carbonate, fluoromethyl ethylene carbonate, difluoromethyl ethylene carbonate, trifluoromethyl ethylene carbonate, bis(fluoromethyl)ethylene carbonate, bis(difluoromethyl)ethylene carbonate, bis(trifluoromethyl) ethylene carbonate, methyl propyl ether, methyl butyl ether, diethyl ether, ethyl propyl ether, ethyl butyl ether, dipropyl ether, propyl butyl ether, dibutyl ether, ethyl vinyl ether, divinyl ether, glyme, diglyme, triglyme, tetraglyme, 1,1,2, 2-Tetrafluoro-3-(1,1,2,2-tetrafluoroethoxy)-propane, trifluoro(trifluoromethoxy)methane, perfluoroethyl ether, fluoromethyl methyl ether, difluoromethyl methyl ether, trifluoromethyl methyl ether, bis(fluoromethyl)ether, bis(difluoromethyl)ether, fluoroethyl methyl ether, difluoroethyl methyl ether, trifluoroethyl methyl ether, bis(fluoroethyl) ether, bis(difluoroethyl)ether, bis(trifluoroethyl)ether, 2-fluoroethoxymethoxyethane, 2,2 difluoroethoxymethoxyethane, methoxy-2,2,2-trifluoroethoxyethane, ethoxy-2-fluoroethoxyethane, 2,2-difluoroethoxyethoxyethane, ethoxy-2,2,2-trifluoroethoxyethane, methyl nanofluorobutyl ether, ethyl nanofluorobutyl ether, 2 fluoroethoxymethoxyethane, 2,2-difluoroethoxymethoxyethane, methoxy 2,2,2 trifluoroethoxyethane, ethoxy-2-fluoroethoxyethane, 2,2-difluoroethoxyethoxyethane, ethoxy 2,2,2-trifluoroethoxyethane, bis(trifluoro) methyl ether, dimethylether, methyl ethyl ether, methyl vinyl ether, perfluoromethyl-vinylether, propylene oxide, tetrahydrofuran, tetrahydropyran, furan, 12-crown-4, 12-crown-5, 18-crown-6, 2-Methyltetrahydrofuran, 1,3-Dioxolane, 1,4-dioxolane, 2-methyloxolane, (1,2-propylene oxide), ethylene oxide, octafluorotetrahydrofuran, acetonitrile, propionitrile, butanenitrile, pentanenitrile, hexanenitrile, hexanedinitrile, pentanedinitrile, butanedinitrile, propanedinitrile, ethanedinitrile, isovaleronitrile, benzonitrile, phenylacetonitrile, cyanogen chloride, hydrogen cyanide, ethanedinitrile, trimethylphosphate, triethylphosphate, isomers thereof, or any combination thereof.

* * * * *